(12) United States Patent
Graham

(10) Patent No.: US 9,770,101 B2
(45) Date of Patent: Sep. 26, 2017

(54) TABLE TIRE

(71) Applicant: Tail Gater Tire Table, Inc., Carson City, NV (US)

(72) Inventor: Ward Haskell Graham, Carson City, NV (US)

(73) Assignee: TAIL GATER TIRE TABLE, INC., Carson City, NV (US)

( * ) Notice: Subject to any disclaimer, the term of this patent is extended or adjusted under 35 U.S.C. 154(b) by 83 days.

(21) Appl. No.: 15/046,711

(22) Filed: Feb. 18, 2016

(65) Prior Publication Data

US 2016/0157603 A1 Jun. 9, 2016

Related U.S. Application Data

(63) Continuation-in-part of application No. 14/506,649, filed on Oct. 4, 2014, now abandoned.

(60) Provisional application No. 61/886,852, filed on Oct. 4, 2013.

(51) Int. Cl.
*A47B 37/00* (2006.01)
*A47B 13/02* (2006.01)
*B60N 3/00* (2006.01)

(52) U.S. Cl.
CPC .............. *A47B 37/00* (2013.01); *A47B 13/02* (2013.01); *B60N 3/001* (2013.01); *B60N 3/005* (2013.01)

(58) Field of Classification Search
CPC B60R 9/02; B60R 3/007; B60R 11/06; B60R 11/00

USPC ......................................... 224/42.13; 108/44
See application file for complete search history.

(56) References Cited

U.S. PATENT DOCUMENTS

| | | | |
|---|---|---|---|
| 4,800,987 A | 1/1989 | Liles | |
| 4,947,961 A * | 8/1990 | Dudley | B60R 3/007 182/150 |
| 5,007,567 A | 4/1991 | Foster | |
| 5,111,909 A * | 5/1992 | Liu | B60R 3/007 182/150 |
| 5,133,429 A | 7/1992 | Densley | |
| 5,971,102 A | 10/1999 | Brown | |
| 6,467,417 B1 | 10/2002 | Guyot | |
| 7,168,523 B1 * | 1/2007 | Tafoya | B60R 3/007 182/150 |
| D573,929 S * | 7/2008 | Black | D12/203 |
| 8,091,907 B1 | 1/2012 | Barnett | |
| 8,616,630 B1 | 12/2013 | Midkiff | |
| 2006/0157301 A1 | 7/2006 | Embretsen | |
| 2006/0226624 A1 | 10/2006 | Chen | |

* cited by examiner

*Primary Examiner* — Adam Waggenspack
(74) *Attorney, Agent, or Firm* — Wenderoth, Lind & Ponack, L.L.P.

(57) ABSTRACT

A tire table has supports or frames that mount a tabletop on a vehicle tire. The table top has a central member that can extend across the inside surface of the tire. The leg members extend from the support or frame and engage the outside surface of the tire. A frame or support extends laterally in a cantilever manner from the tire and supports a tabletop on it. The various parts of the frame or support can be telescopically connected or can be pivotally connected for assembly, disassembly and storage.

15 Claims, 8 Drawing Sheets

TABLE TIRE

REFERENCE TO RELATED APPLICATION

This application is a continuation-in-part of U.S. patent application Ser. No. 14/506,649 filed Oct. 4, 2014, the entire subject matter of which is hereby incorporated by reference.

FIELD OF THE INVENTION

The invention relates to a portable, collapsible and compact table that can be mounted on a vehicle tire in a cantilever manner without table legs engaging the ground to support the table. The table is self-supporting from the vehicle tire in a stable manner, and can be assembled, installed and disassembled without tools or special attachments.

BACKGROUND OF THE INVENTION

Outdoor enthusiasts such as skiers, hikers, bikers, snowmobilers, campers, beach goers and the like, as well as highway road travelers, enjoy packing food and eating homemade meals while on the road. Additionally, people attending tailgate parties for sporting events and other outdoor gatherings often have need for a table at their vehicle.

Tables used for these purposes are often cumbersome and difficult to use. Particularly, tables designed to be mounted on a tire are not suitable compact for storage and are difficult to assemble, disassemble and mount on the tire.

SUMMARY OF THE INVENTION

Objects of the present invention are to provide a tire table that can be easily mounted on a tire, be adjustable to any tire size, be simple to assemble, disassemble, store and mount on a tire, and be simple and inexpensive to manufacture.

These objects are basically obtained by a tire table comprising a rear support, a front support, first and second leg members and a tabletop. The rear support has a rear central member and first and second rear side members extending parallel to one another from the rear central member. The front support has a front central member and first and second side members extending parallel to one another from the front central member. The first and second rear side members are telescopically connected to the first and second side front members, respectively. The first and second leg members extend from the front central member perpendicular relative to the front side members. The tabletop is mounted on the front side members.

These objects are also basically obtained by a tire table having a tabletop with front and rear top portions and front and rear frames. The front frame has a front central member and first and second front side members extending parallel to one another from the front central member. The table top is mounted on the front frame. The rear frame has a rear central member and first and second rear side members extending parallel to one another from the rear central member and being connected to the first and second front side members, respectively. A pivotal coupling connects the front and rear top portions or fore and aft portions of the first and second side members. First and second leg member are pivotably coupled by leg connectors to the first and second rear side members at locations spaced from the rear central member.

Other objects, advantages and salient features of the invention will become apparent from the following detailed description, which, take in conjunction with the annexed drawings, discloses preferred embodiments of the invention.

BRIEF DESCRIPTION OF THE DRAWINGS

Referring to the drawings that form a part of this disclosure.

DETAILED DESCRIPTION OF THE INVENTION

Figure 1:
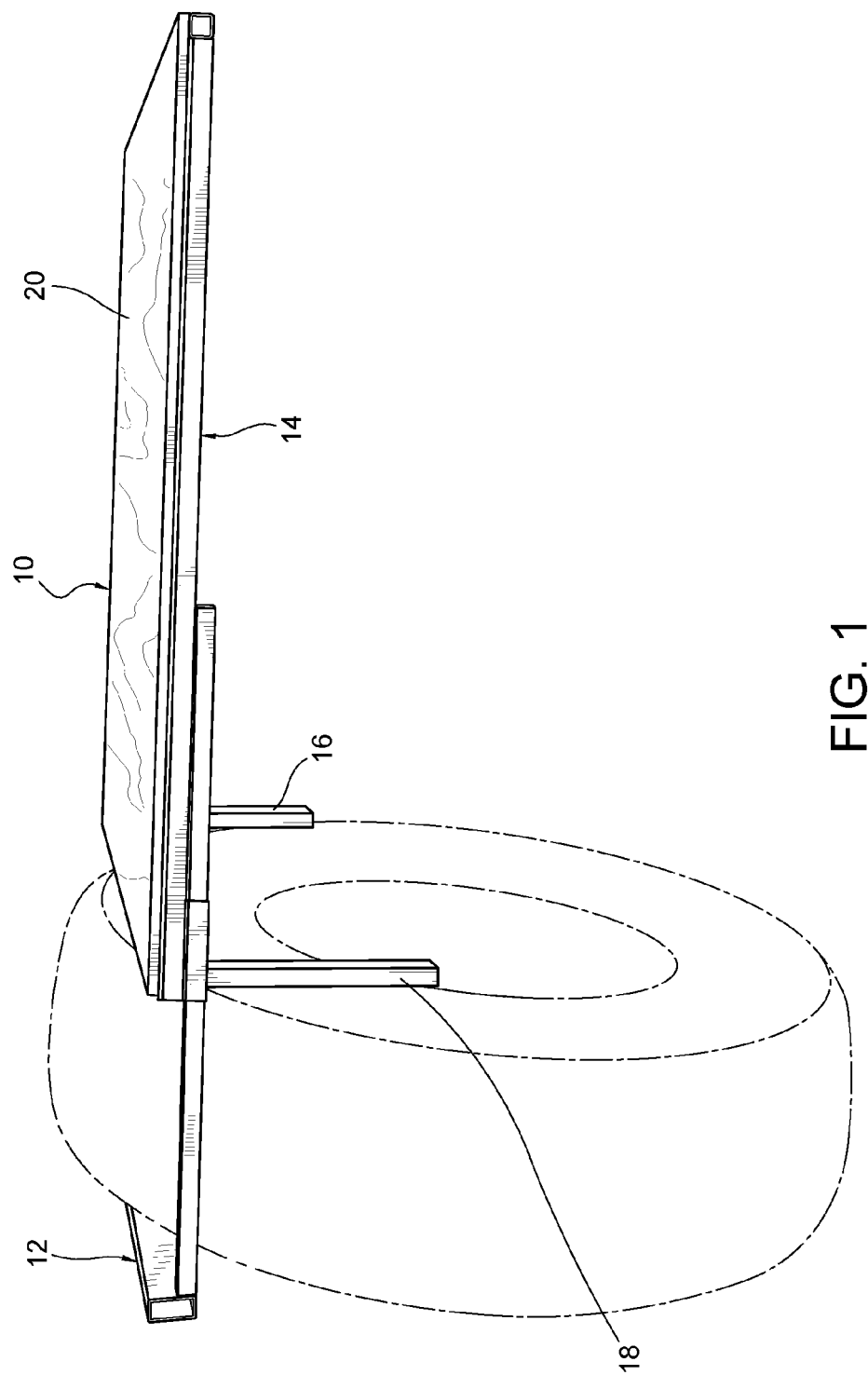
FIG. 1 is a perspective view of a tire table according to a first exemplary embodiment of the invention mounted on a vehicle tire.
Figure 2:
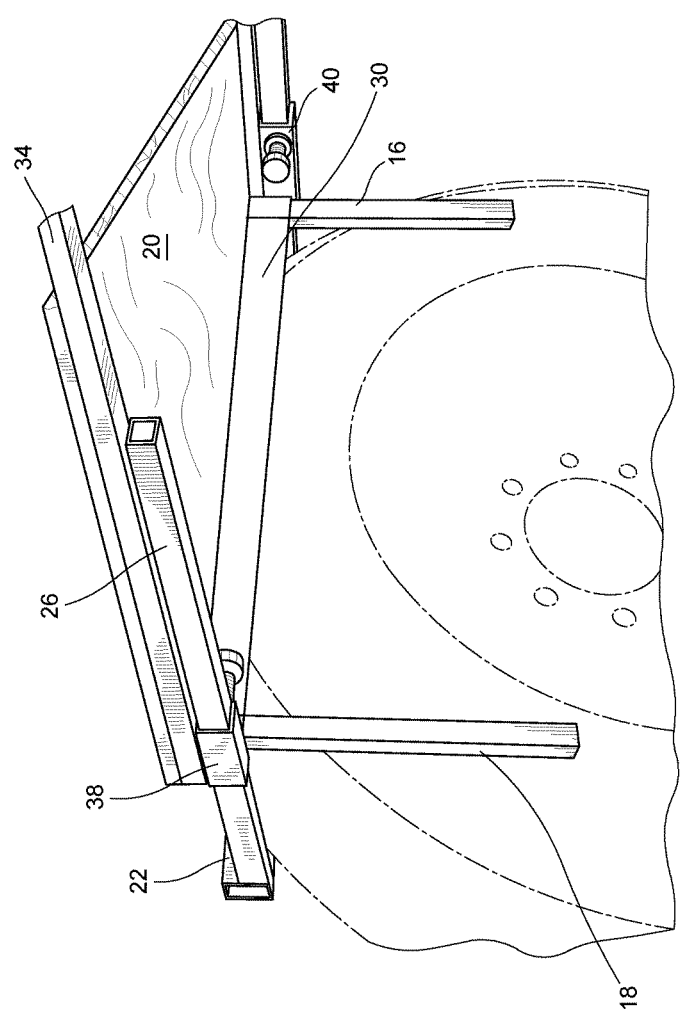
FIG. 2 is a partial perspective view of an underside of the tire table of FIG. 1.
Figure 3:
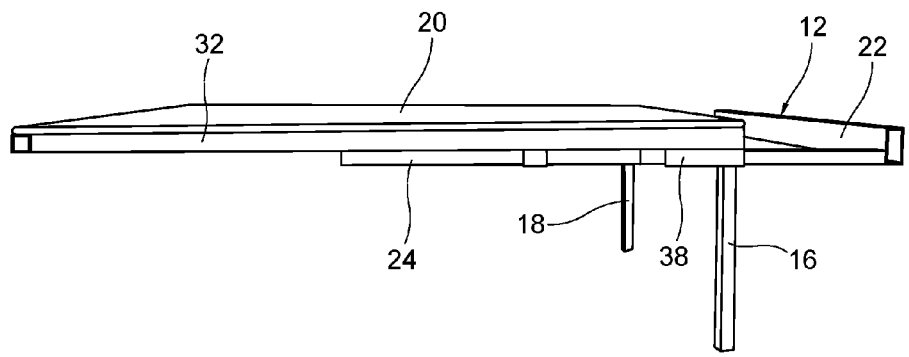
FIG. 3 is a side perspective view of the tire table of FIG. 1.
Figure 4:
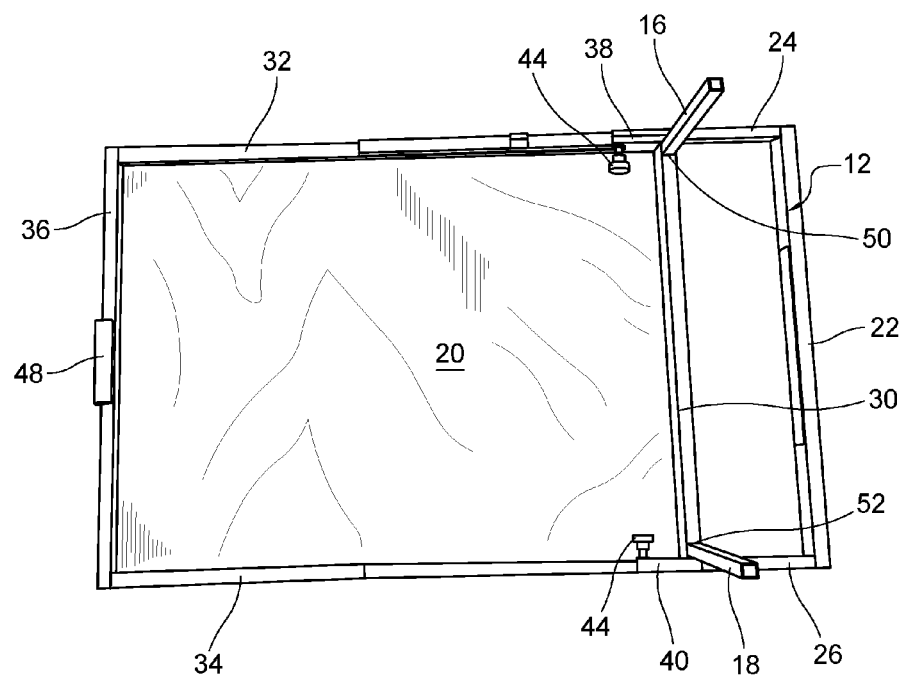
FIG. 4 is a bottom perspective view of the tire table of FIG. 1.
Figure 5:
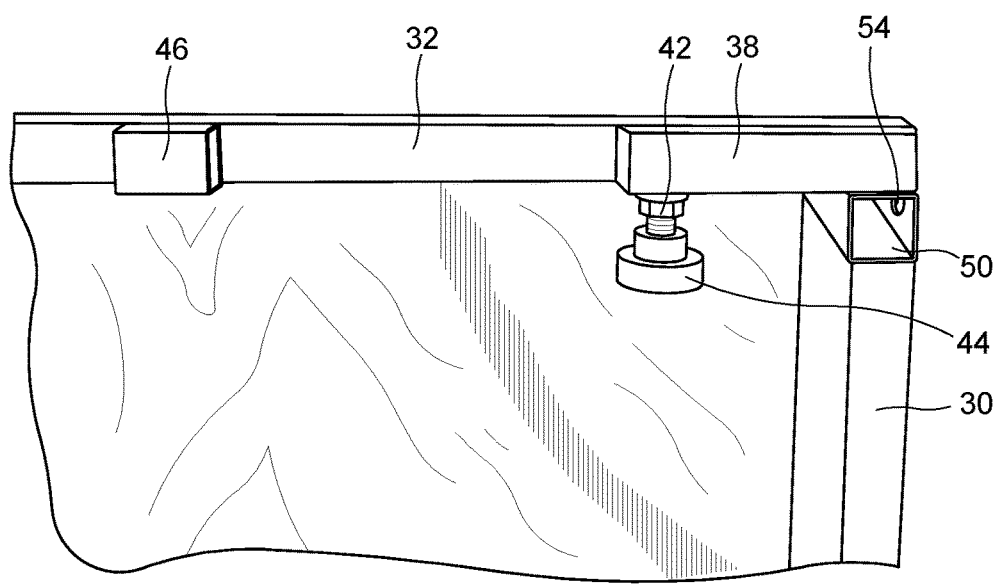
FIG. 5 is an enlarged, partial perspective view of the bottom of the tire table of FIG. 1.
Figure 6:
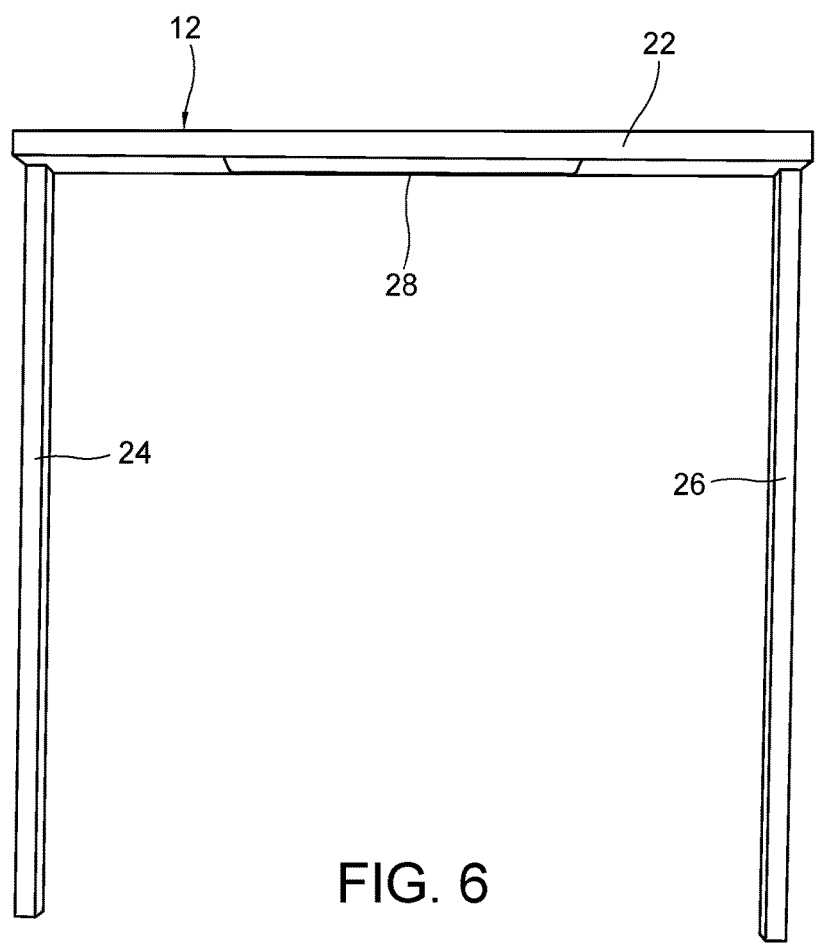
FIG. 6 is a top perspective view of the rear support of the tire table of FIG. 1.
Figure 7:
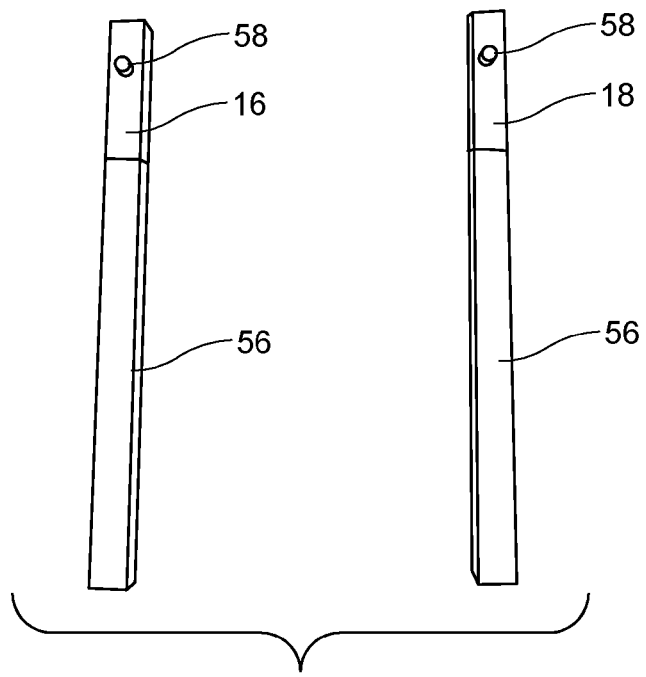
FIG. 7 is a front view of the leg members of the tire table of FIG. 1.
Figure 8:
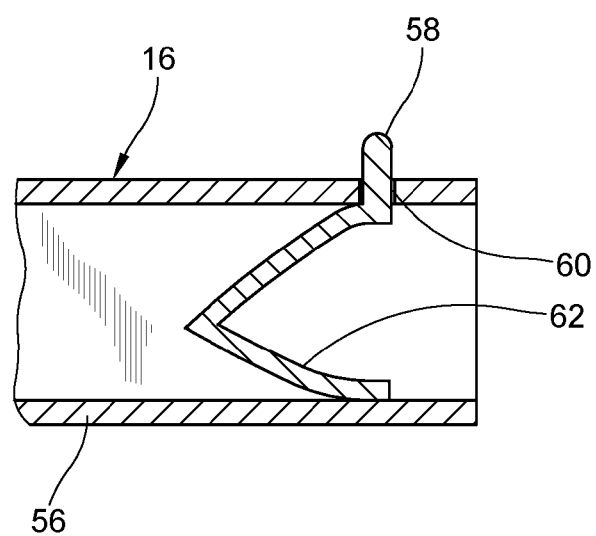
FIG. 8 is a partial side view in section of one of the leg members of FIG. 7.
Figure 9:
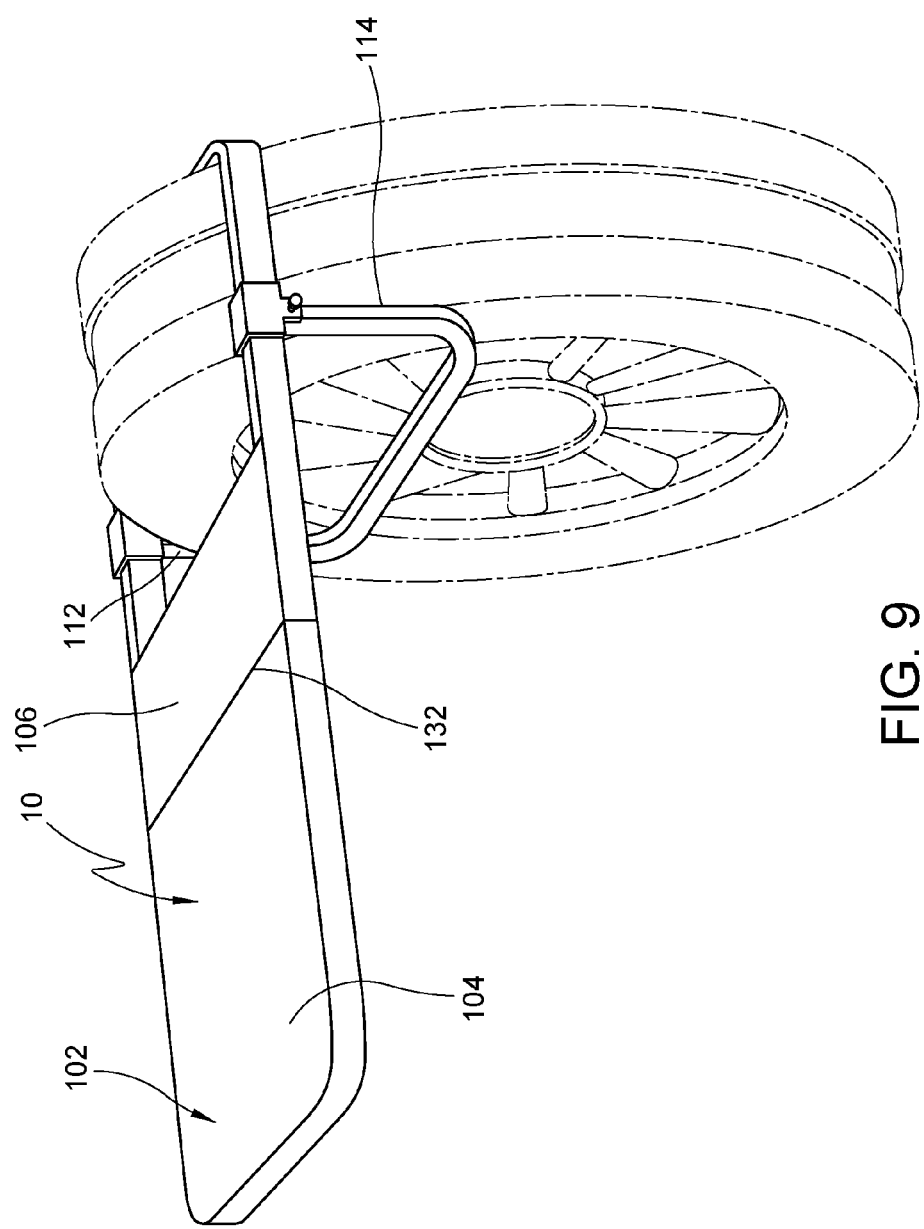
FIG. 9 is a perspective view of a tire table mounted on a vehicle tire according to a second exemplary embodiment of the invention.

Referring initially to the first embodiment of FIGS. 1-7, the tire table 10 comprises a rear support 12, a front support 14, a first leg member 16, a second leg member 18, and a tabletop 20. Rear support 12, as best illustrated in FIG. 6, comprises a rear central member 22, a first rear side member 24 and a second rear side member 26. Each of the rear central member 22, first rear side member 24 and second rear side member 26 are rectangular in transverse cross section and are hollow, with the first and second rear side member being preferably square in transverse cross section. The first and second rear side members 22, 26 extend parallel to one another from the rear central member 22 and are fixedly attached, particularly by welding of these metal members. A frictional surface member 28 is provided on the inner surface of the rear central member 22 to enhance frictional engagement with the inside surface of a vehicle tire. The rear central member 22 has a greater transverse cross section than either of the rear side members 24, 26.

The front support 14 comprises a front central member 30 and first and second front side members 32, 34. First and second front side members 32, 34 extend parallel to one other from the front central member 30. A front end member 36 connects the ends of the side members 32 and 34 remote from the front central member 30. Each of the front central members 30, first and second side members 32, 34 and front end member 36 are hollow tubes that are rectangular, preferably square, in transverse cross section and are welded together. The opposite longitudinal ends of front central member 30 are fixedly attached to inside surfaces of front and second side members 32, 34.

First and second guide tubes 38, 40 are fixed to the lower surface of first and second front side members 32, 34, respectively, at their ends adjacent to front central member 30. These guide tubes 38, 40 are hollow members being rectangular, preferably square, in transverse cross section and having internal configurations shaped to mate with the outer configurations of rear side members 24, 26. The rear side members 24, 26 are slidably received in the guide tubes 38, 40 to provide an adjustable, telescopic connection between the rear side members 24, 26 and the front side members 32, 34.

Each guide tube 38, 40 has an internally threaded aperture provided by a nut 32 welded to the respective guide tube. Each nut 32 receives an externally threaded set screw 44 that can adjustably enter into the interior of the respective guide tube 38, 40 and that can engage a side wall of the respective rear side member 24, 26 frictionally to retain it in an adjusted position. A secondary guide tube 46 can also be provided on the lower surface each front side member 32, 34 at a distance from the guide tubes 38, 40 to also receive the respective rear side members 24, 26 therein slidably to enhance stability of the assembly.

The front end member is provided with a storage member or handle 48. The storage member or handle member 48 is located on the lower surface of the front end member 36 remote from the tabletop 20 and is centrally located between the opposite longitudinal ends of the front end member 36.

The front central member 30 has first and second rectangular-shaped, preferably square-shaped, openings 50, 52 adjacent the first and second front side members 32, 34, respectively. These openings conform in shape and receive ends of the leg members 16, 18. A passage 54 extends transversely through the wall of each end of the front central member 30 from its exterior into each opening 50, 52.

Each leg member 16, 18 comprises a rectangular, preferably square, in transverse cross section hollow tube. One surface of each leg member 16, 18 has a frictional surface 56 to enhance engagement with the tire outside surface. A pin 58 is movably mounted in each leg member 16, 18 and extends through a passage 60 in each leg member 16, 18. The pin 58 is biased by a leaf spring 62 into an extended position from the respective leg member 16, 18. The leaf spring 62 allows the pin 58 to be retracted within the interior of the leg to at least a degree in which the free end of the pin is substantially coplanar with the outside surface of the leg member 16, 18 in which the passage 60 extends to allow the leg member end to enter the respective opening 50, 52. The leg members 16, 18 are releasably retained within the openings 50, 52 and are retained in those positions by the pins 58 extending into the respective passages 54, 60. The leg members 16, 18 can be inserted and withdrawn from the respective openings 50, 52 by depressing pins 58 in a manner such that each leg member 16, 18 can pass into the respective opening 50, 52 or out of the respective opening 50, 52 by being removed from the passage 54 and then can be locked in position by allowing the respective pin 58 to move under the bias of leaf spring 62 into the passage 54.

The tabletop 20 is a thin flat sheet having a rectangular configuration. The tabletop 20 can be suitably affixed to an upper surface of the front support 14 by welding, fasteners or adhesive and can be made of any suitable material such as wood, plastic or metal.

In a disassembled configuration, the legs 16, 18 are removed from front support 14 and rear support 12 can be disengaged from the guide tubes 38, 40. In this disassembled configuration, the parts can be laid flat. Alternatively, the rear support can be engaged with the front support 14 with the rear central member 22 pushed inwardly as far as possible to be in contact or at least adjacent to the front central member 30. The set screws 44 can then be engaged to lock the two supports relative to one another.

When the table is to be used, the legs 16, 18 are inserted and locked in place in openings 50, 52 by the pins 58 being extended through both sets of passages 54, 60. The set screws 44 are loosened to allow relative movement between the rear support 12 and front support 14 to provide the appropriate space between the central members 22, 30 to correspond to the vehicle tire width. When the appropriate distance is provided, the set screws 44 are tightened to lock the relative positions of the front end rear supports 12, 14. With the tire table 10 fully assembled in this manner, it can be mounted on a tire on a vehicle as particularly illustrated in FIG. 1, with rear central member 20 located on the inside surface of the tire and leg members 16, 18 located on the outside surface of the tire and with the frictional surfaces 28, 56 facing the tire. In this position, the tire table is cantilevered on the tire and is self-supporting without any additional structure.

Tire table 100 of second embodiment comprises a tabletop 102 with front and rear portions 104, 106 that are separate from one another. Specifically, the front and rear top portions 104, 106 are separate pieces that are connected to one another as explained hereinafter.

Tabletop 100 is supported on a vehicle tire, while on a vehicle, by a front frame 108 and a rear frame 110. The front and rear frames 108, 110 support the tabletop 102 on the vehicle tire with first and second leg member 112, 114.

The front frame 108 has a front central member 116 and first and second front side members 118, 120 extending parallel to one another and from the front central member 116. The tabletop 102 is mounted on the front frame 108. Each of the front side members 118, 120 is separated into fore and aft portions 122, 124. These fore and aft portions 122, 124 are connected end to end in the fully assembled configuration of the tire table 100.

The rear frame 110 has a rear central member 126 and first and second rear side members 128, 130 extending parallel to one other from the rear central member 126. Ends of the rear side members 128, 130 are connected to free ends of the rear side members 118, 120, respectively.

A pivotably coupling 132 connects the front and rear top portions of the tabletop. Alternatively, the coupling 132 can connect the fore and aft portions 122, 124 of the first and second front side members 118, 120. Pivotable coupling 132 can be in the form of a piano hinge.

Figure 10:
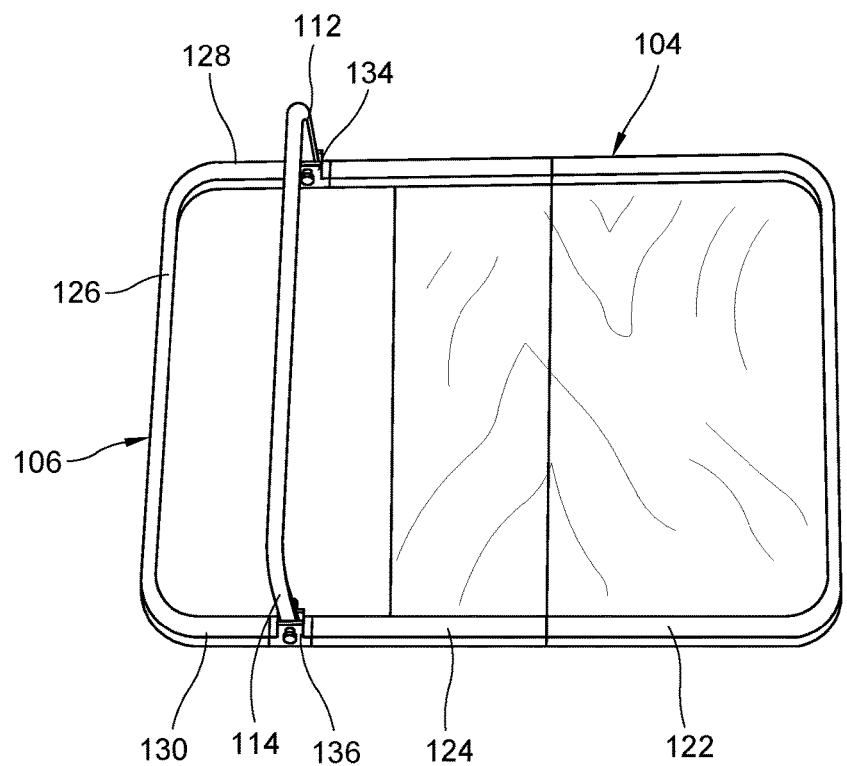
FIG. 10 is a bottom perspective view of the tire table of FIG. 9.
Figure 11:
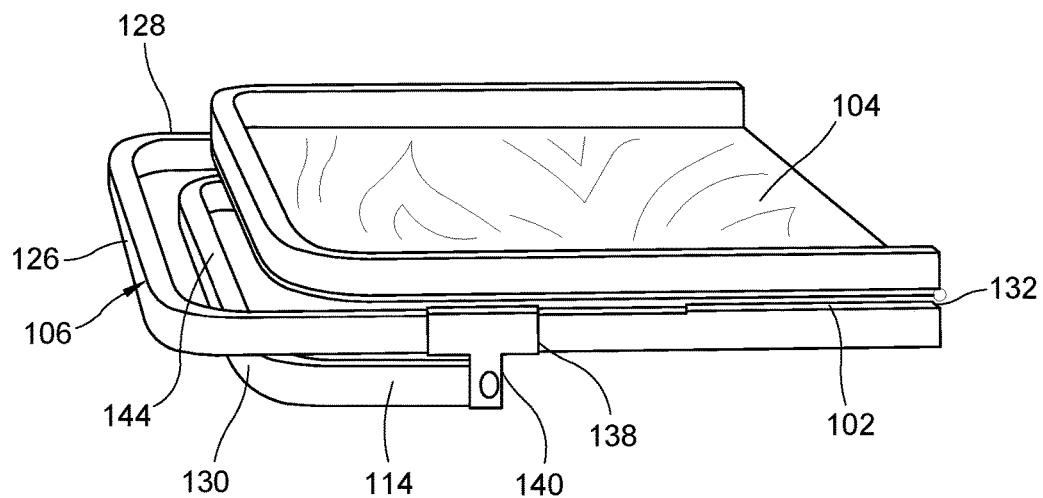
FIG. 11 is a perspective of the tire table of FIG. 9 in a collapsed condition.

Leg connectors 134, 136 pivotally couple leg members to the first and second rear side members 128, 130 at locations spaced from rear center member 126. Each leg connector comprises a sleeve 138 that receives and connects adjacent ends of the respective front and rear side members 128, 130. A tab 140 extends downwardly from each sleeve and has a pivot pin 142 that extends through respective openings in the tab 140 and in the adjacent free end of the respective leg members 112, 114. In this manner, the leg members 112, 114 can pivot between the stored position illustrated in FIG. 12 and the operational or extended position illustrated in FIG. 10. The pivoting between the stored and extended positions is limited to a 90 degree angle.

A magnetic latch can be provided on each leg member 112, 114 to retain the leg in its stored position. The ends of the legs remote from the leg connectors can be connected by a bar member 144.

Figure 12:
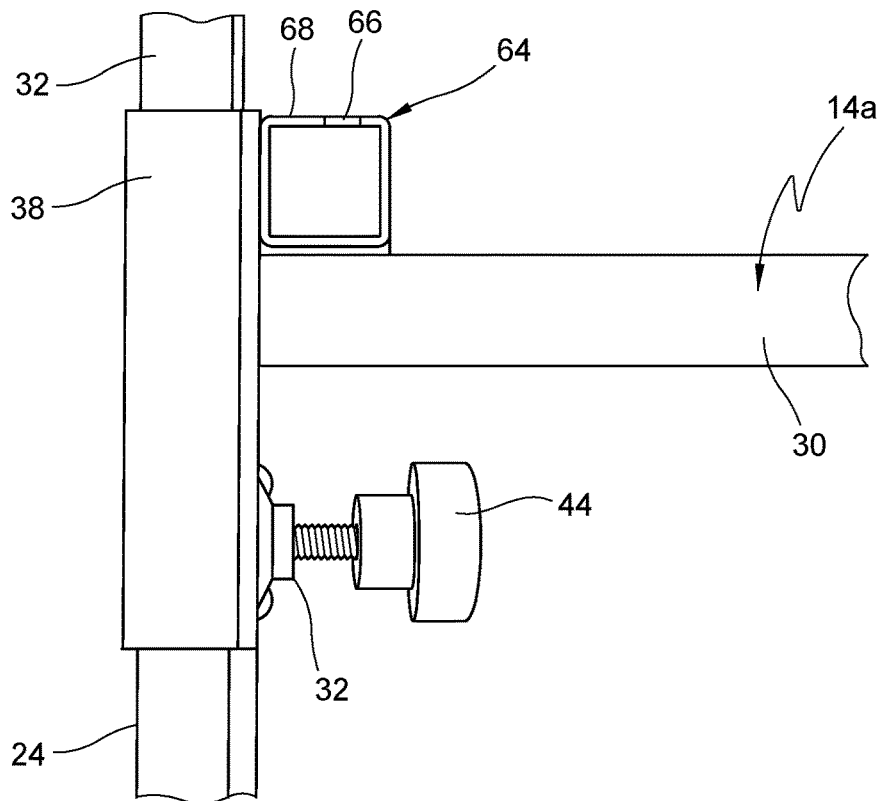
FIG. 12 is a partial bottom plan view of a tire table according to a third exemplary embodiment of the invention without the leg members and table top.

In using the tire table 110 as initially provided or stored in the position illustrated in FIG. 12 to mount the tire table on a vehicle wheel on a vehicle, the leg members 112, 114 are pivoted from their stored position to their extended position. The front top portion 104 of the tabletop 102 is pivoted to be coplanar with the rear top portion 106. In this position, the tire table is ready for mounting on the vehicle tire by placing the tire between the rear central member 126 and the extended leg members 112, 114. The upper portion of the tire extends in the gap between the rear central member 126 and the edge of rear top portion 106 remote from pivotable coupling 132.

Figure 13:
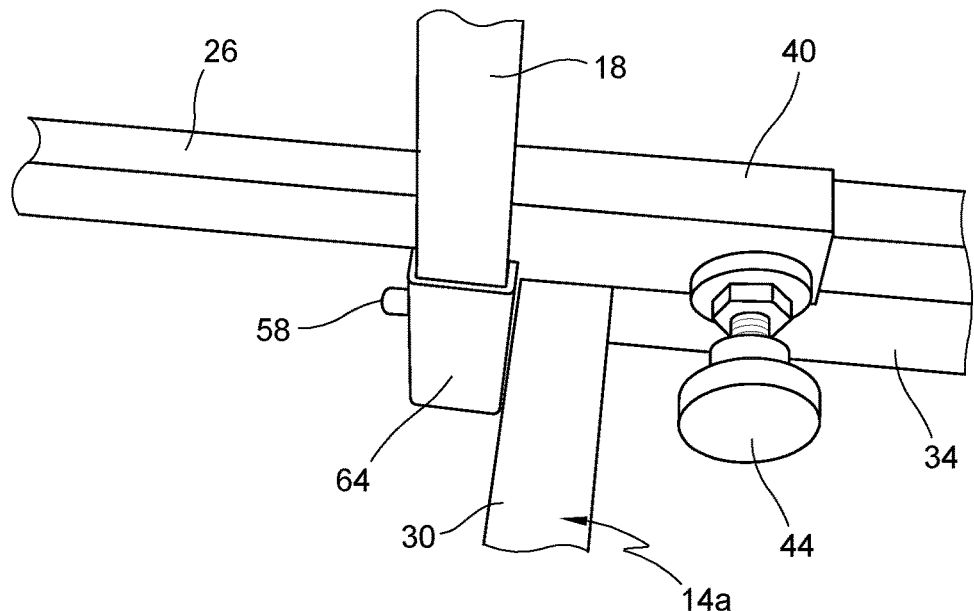
FIG. 13 is a bottom perspective view of the tire table of FIG. 12 with a leg member added.

FIGS. 12 and 13 illustrate a front support 14a, similar to the front support 14 of the first embodiment, but differing only in the structure for attaching leg members 16, 18 to the front support. The square-shaped openings 50, 52 in front central member 30 of the first embodiment of FIGS. 1-7 are omitted in this third embodiment, and are replaced by hollow tubes 64 fixedly attached to at the inside junctions of the front side members 32, 34, guide tubes 38, 40 and the front central member 30, for example, by welding. Tubes 64 are rectangular, preferably square, in transverse cross section and sized to receive end portions of the leg members 16, 18. Openings 66 are provided in sides 68 of tubes 64 that are not attached to the front side members 32, 34, guide tubes 38, 40 and front central member 30. These openings 66 receive the pins 58 of the leg members 16, 18 to releasably retain the leg members in the tubes 64.

While various embodiments have been chosen to illustrate the invention, it will be understood by those skilled in the art that various changes and modifications can be made therein without departing from the scope of the invention as defined in the appended claims.

What is claimed is:

1. A tire table comprising:
    a rear support having a rear center member and first and second rear side members extending parallel to one another from said rear central portion;
    a front support having a front central member and first and second front side members extending parallel to one another from said front central member, said first and second rear side members being telescopically connected to said first and second front side members, respectively;
    first and second leg members extending from said front central member perpendicularly relative to said front side members; and
    a tabletop mounted on said front side members; whereby said front and rear supports are able to secure a tire therebetween and are able to be supported on the tire with the leg members and the front central member being able to engage the tire such that the leg members depend from the front central member and said front side members and said table top are cantilevered from the tire.

2. A tire table according to claim 1 wherein said first and second front side members comprise hollow first and second guide tubes receiving said first and second rear side members therein, respectively.

3. A tire table according to claim 2 wherein first and second set screws are threadly mounted in said first and second guide tubes and engage sides of said first and second rear side members, respectively.

4. A tire table according to claim 3 wherein said first and second guide tubes have internally threaded bores receiving said set screws.

5. A tire table according to claim 1 wherein said front support comprises a front end member extending between and connecting ends of said front side members remote from said front central member.

6. A tire table according to claim 5 wherein said front end member comprises a storage member thereon between ends of said front end member.

7. A tire table according to claim 1 wherein each of said members is polygonal in transverse cross section.

8. A tire table according to claim 1 wherein said front central member has first and second openings adjacent said first and second front side member, respectively, said first and second openings receiving a first and second end portions of said first and second leg members, respectively.

9. A tire table according to claim 8 wherein first and second pins extend through aligned passages in said front central member and said first and second end portions of said first and second leg members, respectively.

10. A tire table according to claim 9 wherein said first and second pins are movably mounted in said first and second leg members, respectively, and are biased by springs into extended positions protruding from the respective leg members.

11. A tire table according to claim 10 wherein said springs are leaf springs.

12. A tire table according to claim 1 wherein first and second hollow tubes are attached to inside junctions of said front central member with said front and second front side members, respectively, said first and second hollow tubes receiving first and second end portions of said first and second leg members, respectively.

13. A tire table according to claim 12 wherein first and second pins extend through aligned passages in said first and second hollow tubes and said first and second end portions of said first and second leg members, respectively.

14. A tire table according to claim 13 wherein said first and second pins are movably mounted in said first and second leg members, respectively, and are biased by springs into extended positions protruding from the respective leg members.

15. A tire table according to claim 14 wherein said springs are leaf springs.

* * * * *